: US 11,442,003 B2
(45) Date of Patent: Sep. 13, 2022

(12) United States Patent
Yu et al.

(54) MAINTENANCE METHOD OF GAS DETECTING DEVICE

(71) Applicant: RADIANT INNOVATION INC., Hsinchu County (TW)

(72) Inventors: Shao-Yun Yu, Hsinchu (TW); Tseng-Lung Lin, Hsinchu County (TW); Yu-Chien Huang, Hsinchu (TW); Yu-Tai Sung, Hsinchu (TW)

(73) Assignee: RADIANT INNOVATION INC., Hsinchu County (TW)

( * ) Notice: Subject to any disclaimer, the term of this patent is extended or adjusted under 35 U.S.C. 154(b) by 232 days.

(21) Appl. No.: 17/029,045

(22) Filed: Sep. 23, 2020

(65) Prior Publication Data
US 2022/0091008 A1  Mar. 24, 2022

(51) Int. Cl.
G01N 21/15 (2006.01)
G01N 15/06 (2006.01)
G01N 15/02 (2006.01)
G01D 11/24 (2006.01)
G01N 15/00 (2006.01)
G01N 21/01 (2006.01)

(52) U.S. Cl.
CPC .......... *G01N 21/15* (2013.01); *G01D 11/245* (2013.01); *G01N 15/0205* (2013.01); *G01N 15/06* (2013.01); *G01N 2015/0046* (2013.01); *G01N 2015/0693* (2013.01); *G01N 2021/0106* (2013.01); *G01N 2021/155* (2013.01); *G01N 2021/157* (2013.01); *G01N 2201/022* (2013.01)

(58) Field of Classification Search
CPC .............. G01N 15/0205; G01N 21/15; G01N 2015/0693; G01N 2021/0106; G01N 2021/155; G01N 2021/157; G01N 2201/022; G01D 11/245
See application file for complete search history.

(56) References Cited

U.S. PATENT DOCUMENTS

| 4,826,316 | A | * | 5/1989 | Odum ................. G08B 29/14 250/372 |
| 2020/0318945 | A1 | * | 10/2020 | Mutlu .................... G01S 17/34 |
| 2021/0148807 | A1 | * | 5/2021 | Jutte .................. G01N 15/1429 |
| 2022/0091009 | A1 | * | 3/2022 | Yu ...................... G01N 21/3504 |

\* cited by examiner

*Primary Examiner* — Benjamin R Schmitt
(74) *Attorney, Agent, or Firm* — Li & Cai Intellectual Property Office

(57) ABSTRACT

A maintenance method of a gas detecting device includes the following steps: providing the gas detecting device that includes a shell component, a sensing component, a dust blocking element, and a detecting area, the sensing component including a sensor, a reference light source, and a processor, and the dust blocking element including a cover; the reference light source generating a reference beam projecting toward the cover and the detecting area, and the reference beam generating a feedback beam projecting toward the cover and the sensor through being reflected by a part of the shell component positioned at the detecting area; the sensor receiving the feedback beam to generate a measured information; and the processor comparing the measured information to an initial information in the processor, so as to obtain a pollution degree information of the cover.

10 Claims, 17 Drawing Sheets

MAINTENANCE METHOD OF GAS DETECTING DEVICE

FIELD OF THE DISCLOSURE

The present disclosure relates to a maintenance method, and more particularly to a maintenance method of a gas detecting device.

BACKGROUND OF THE DISCLOSURE

Firstly, a problem with a conventional gas detecting device used to measure particulate matter is that, after being used for a period of time, a light sensing element of the gas detecting device that is used to detect light can be polluted by the dust and the particulate matter, which leads to a decrease in the accuracy of the gas detecting device.

Moreover, when a highly polluted situation (e.g., a haze damage, a fire nearby the surrounding environment, and the dust from a construction site) suddenly occurs in the external environment, the conventional gas detecting device can be immediately polluted, which affects the accuracy of the gas detecting device.

Furthermore, when the conventional gas detecting device becomes polluted, the entire gas detecting device has to be replaced, which causes the cost to increase.

Therefore, enhancing the measurement accuracy, the stability, and the service life of the gas detecting device through improving the structural design of the gas detecting device, so as to overcome the abovementioned inadequacies has become an important issue of the industry.

SUMMARY OF THE DISCLOSURE

In response to the above-referenced technical inadequacies, the present disclosure provides a maintenance method of a gas detecting device.

In one aspect, the present disclosure provides a maintenance method of the gas detecting device including: providing the gas detecting device, the gas detecting device including a shell component, a sensing component, a dust blocking element, and a detecting area, the sensing component and the dust blocking element being disposed in the shell component, and the sensing component and the dust blocking element being disposed corresponding to the detecting area, wherein the sensing component includes a sensor, a reference light source, and a processor, the processor is electrically connected to the sensor, the dust blocking element includes a cover, and the cover is light permeable; generating a reference beam projecting toward the cover and the detecting area through the reference light source, the reference beam generating a feedback beam projecting toward the cover and the sensor through being reflected by a part of the shell component positioned at the detecting area; receiving the feedback beam through the sensor to generate a measured information; and comparing the measured information to an initial information in the processor through the processor, so as to obtain a pollution degree information of the cover.

One of the advantages of the present disclosure is that the maintenance method of the gas detecting device is able to obtain the pollution degree information of the cover of the gas detecting device, so as to inform a user of replacing the dust blocking element with a new or clean one through "generating a reference beam projecting toward the cover and the detecting area through the reference light source, the reference beam being able to generate a feedback beam projecting toward the cover and the sensor through being reflected by a part of the shell component positioned at the detecting area", "receiving the feedback beam through the sensor to generate a measured information", and "comparing the measured information to an initial information in the processor through the processor, so as to obtain a pollution degree information of the cover", which enhance the accuracy and the stability of measurement of the gas detecting device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
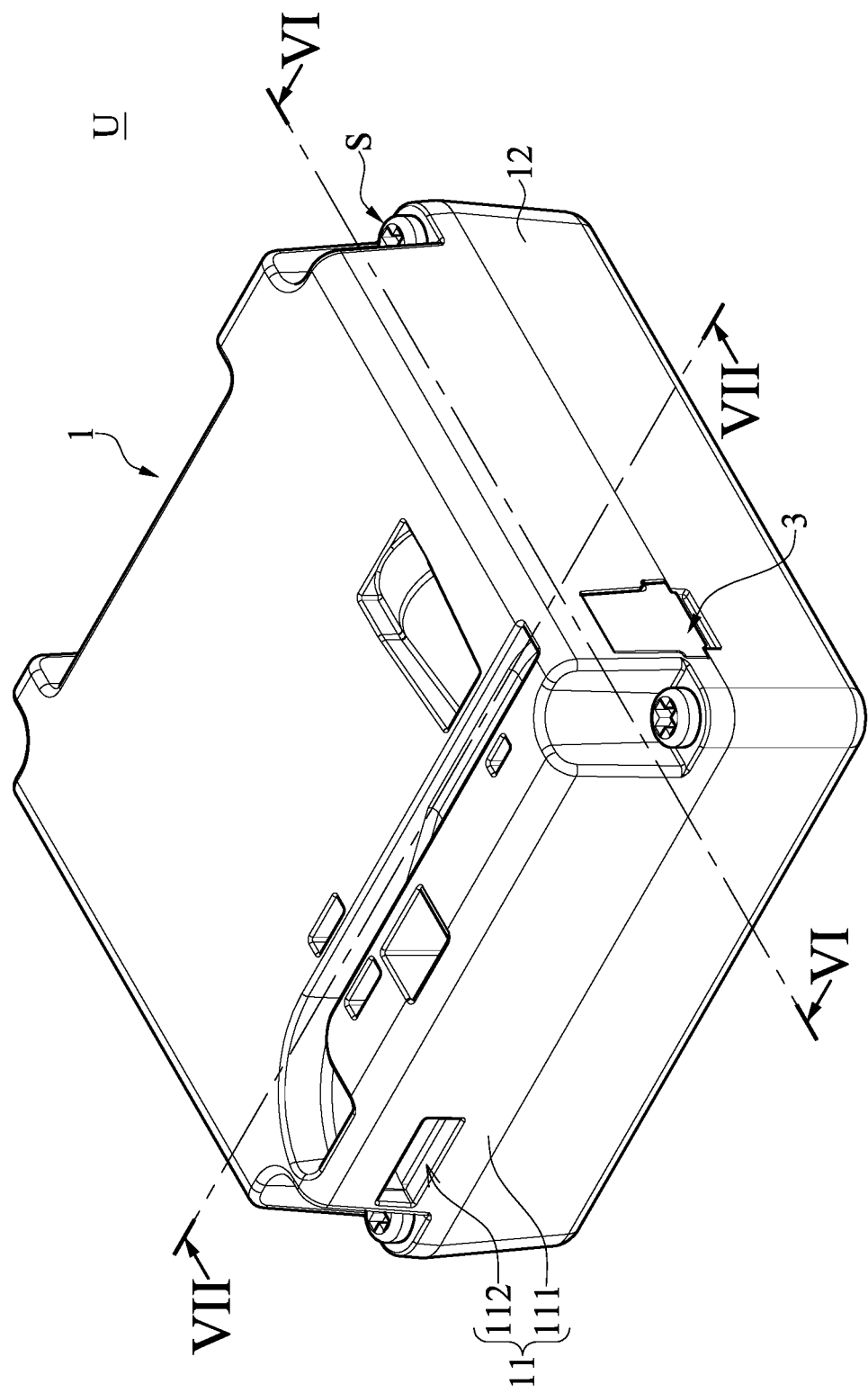
FIG. 1 is an assembled perspective schematic view of a gas detecting device in a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
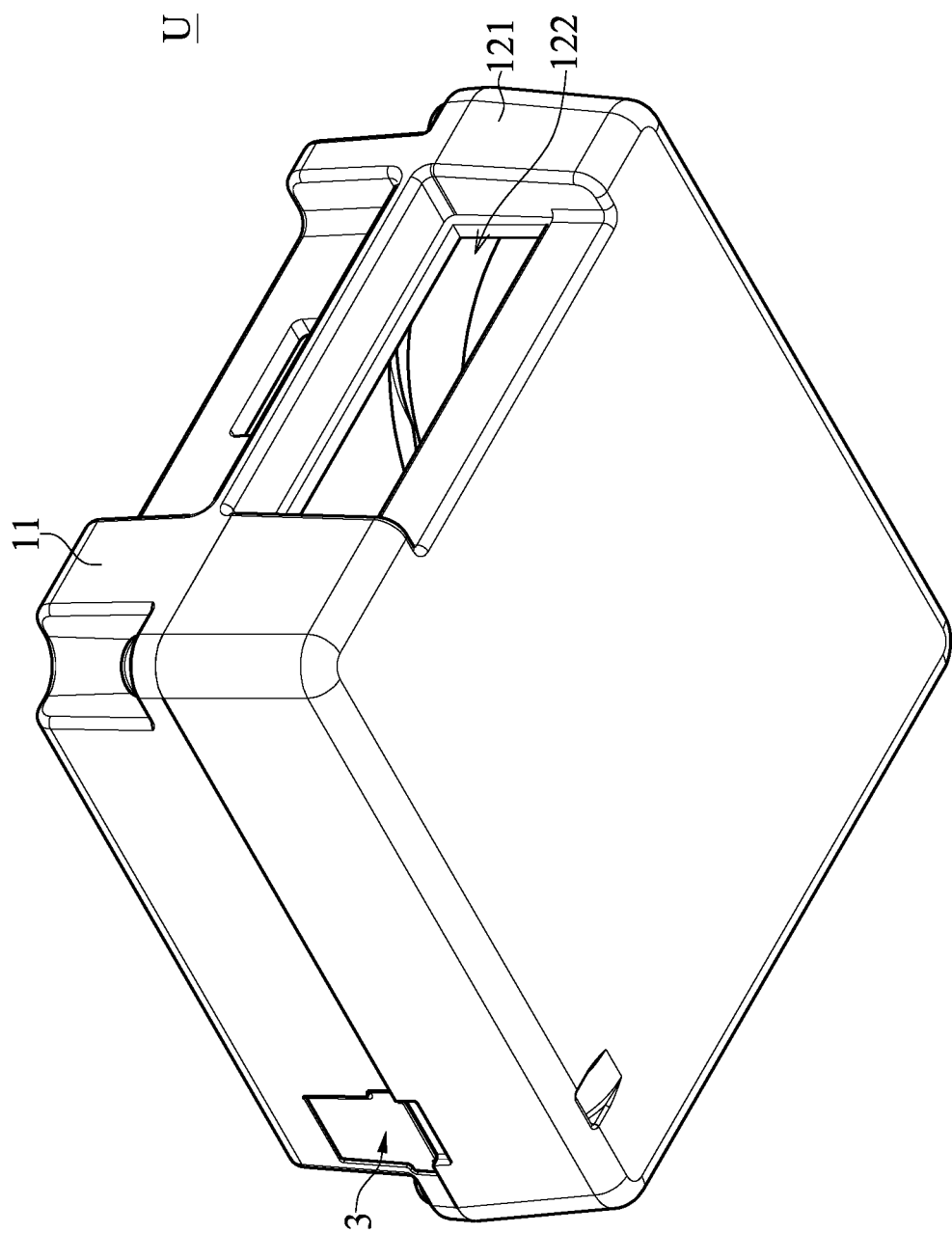
FIG. 2 is another assembled perspective schematic view of the gas detecting device in the first embodiment of the present disclosure.

Firstly, references are made to FIG. 1 and FIG. 2, which are assembled perspective schematic views of a gas detecting device in the first embodiment of the present disclosure. The present disclosure provides the gas detecting device U and a maintenance method for the same, the first embodiment describes a structure of the gas detecting device U and the second embodiment further describes a maintenance method of the gas detecting device U. Specifically speaking, the first embodiment provides the gas detecting device U, so as to detect the characteristics of a gas under test (not shown in the figures). For example, the gas detecting device U can be utilized to detect the size and the concentration of the dust and the particulate matter (PM) in the gas under test, e.g., $PM_{10}$ or $PM_{2.5}$. However, it should be noted that the present disclosure does not limit the characteristics of the gas under test detected by the gas detecting device U. That is to say, in other embodiments, the gas detecting device U and the maintenance method for the same provided by the present disclosure can also be utilized to detect the concentration of other gases.

Figure 3:
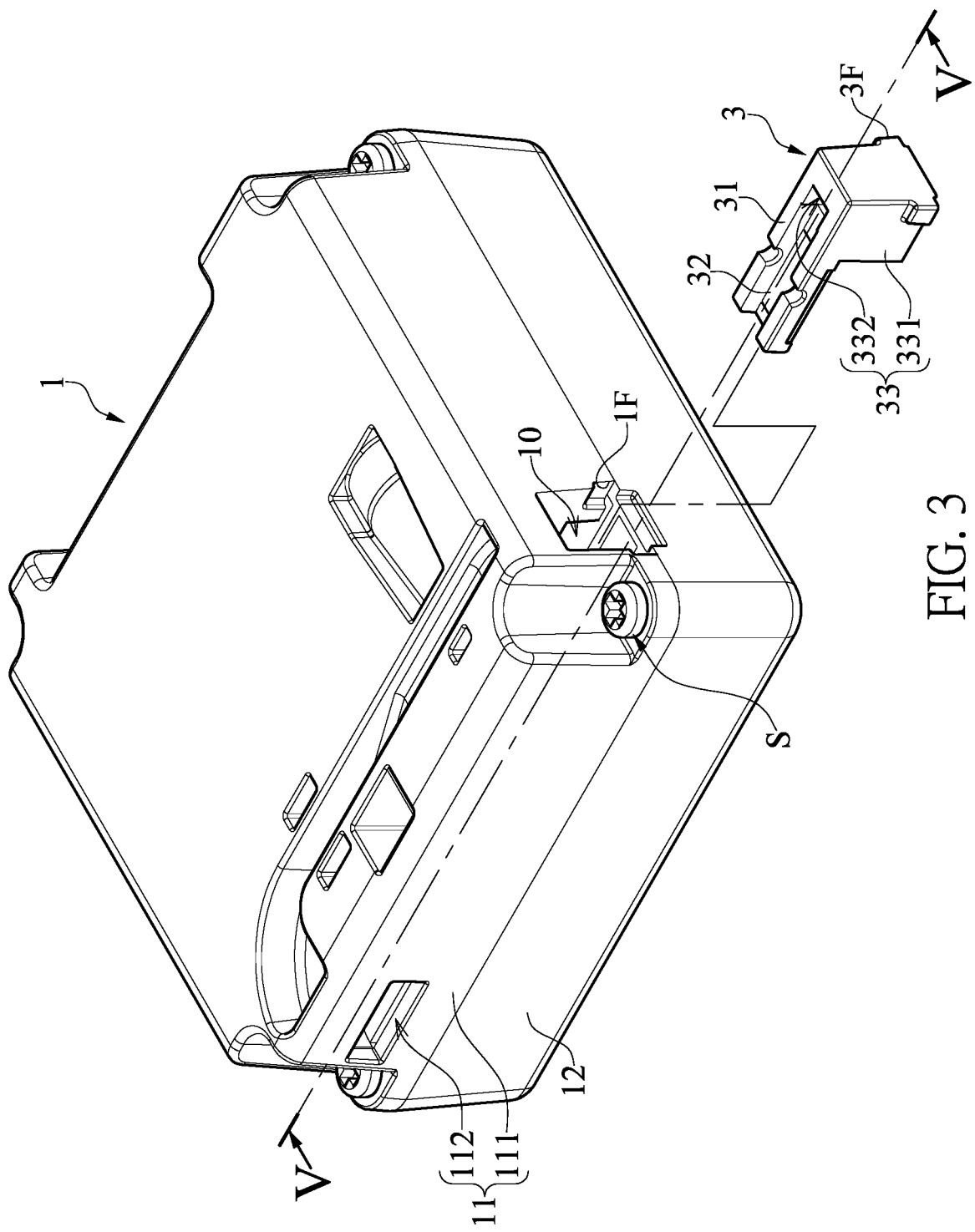
FIG. 3 is a schematic view of the gas detecting device in use in the first embodiment of the present disclosure.
Figure 4:
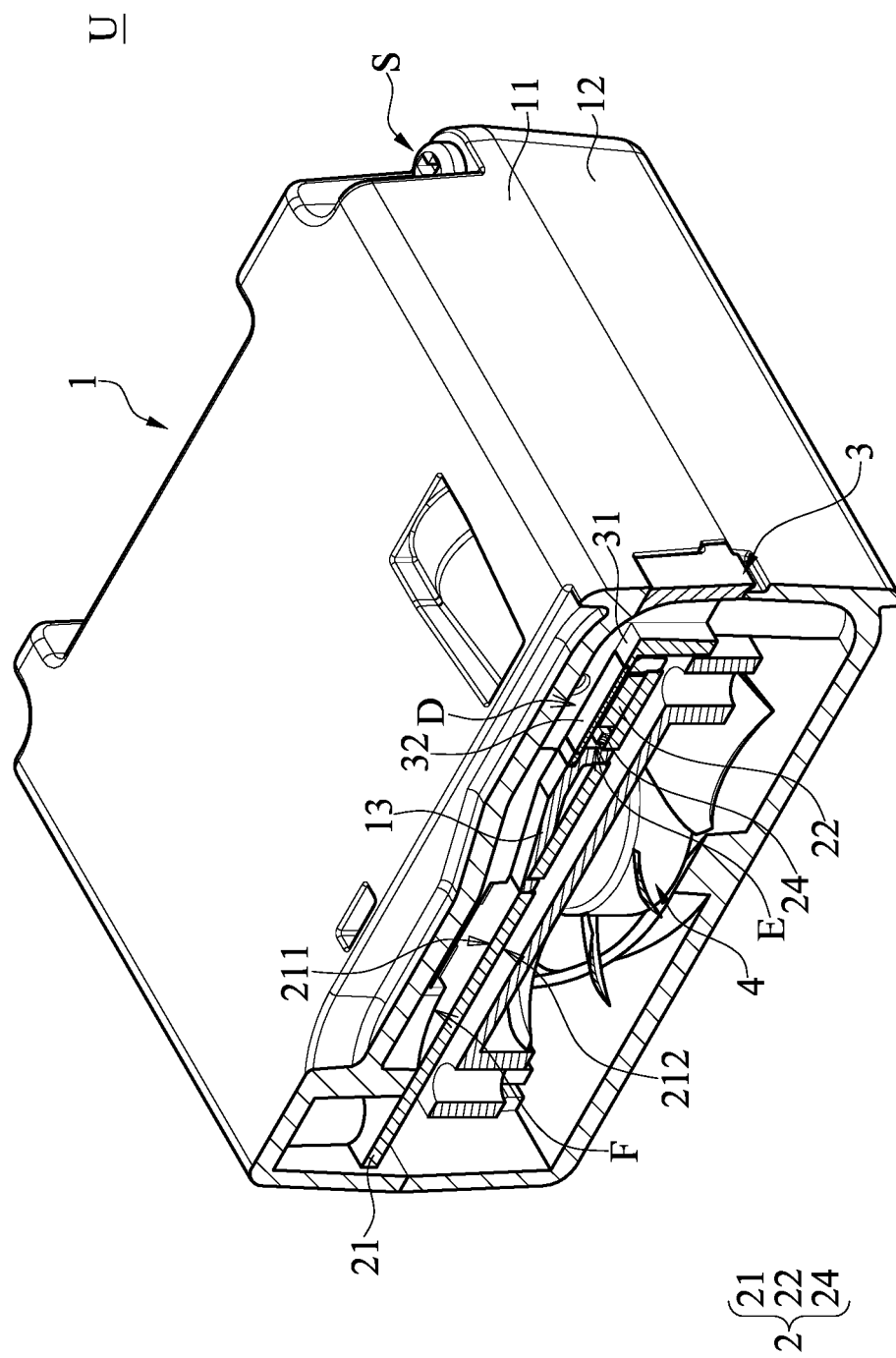
FIG. 4 is a cross-sectional perspective schematic view taken along line VII-VII of FIG. 1.
Figure 5:
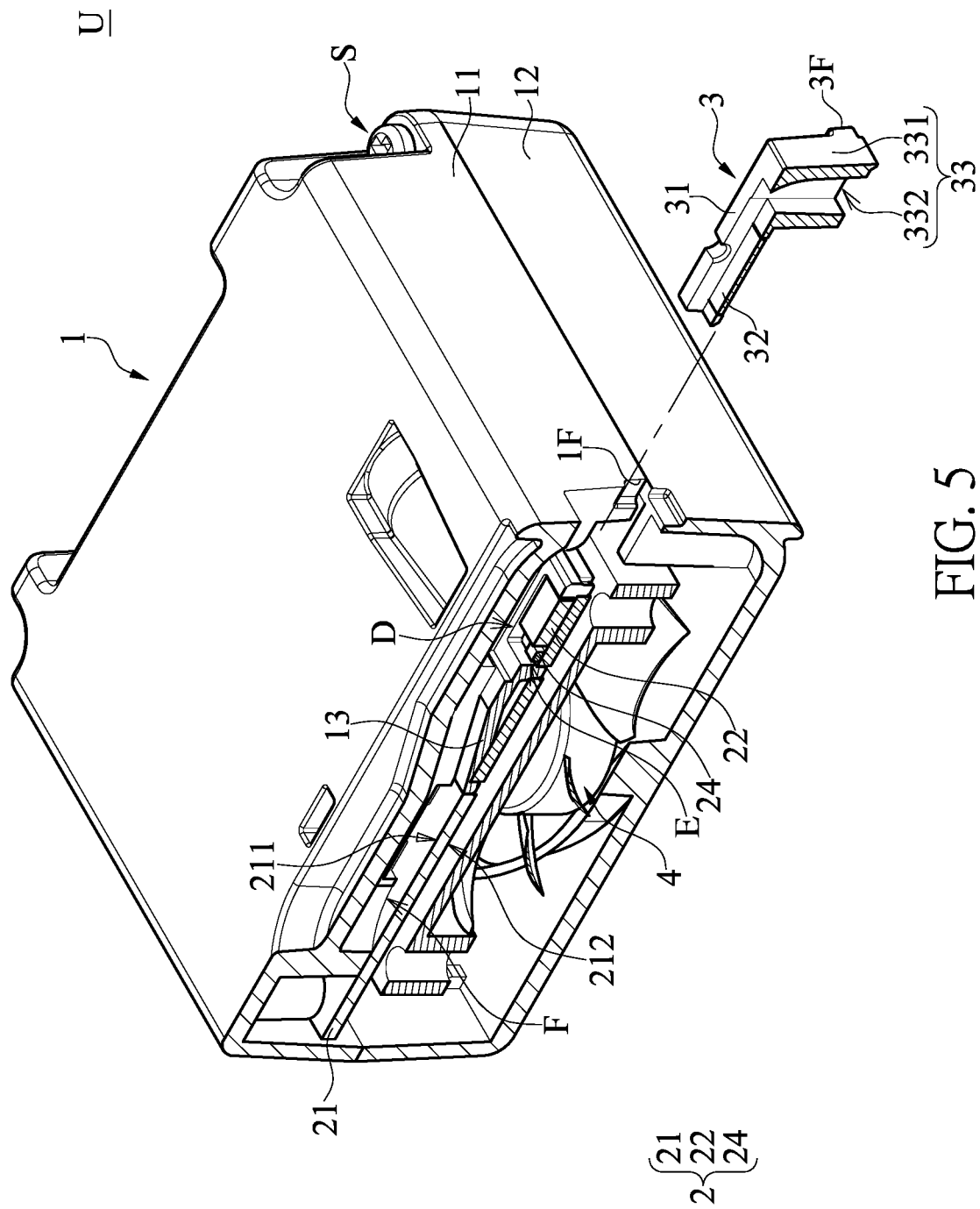
FIG. 5 is a cross-sectional perspective schematic view taken along line V-V of FIG. 3.
Figure 6:
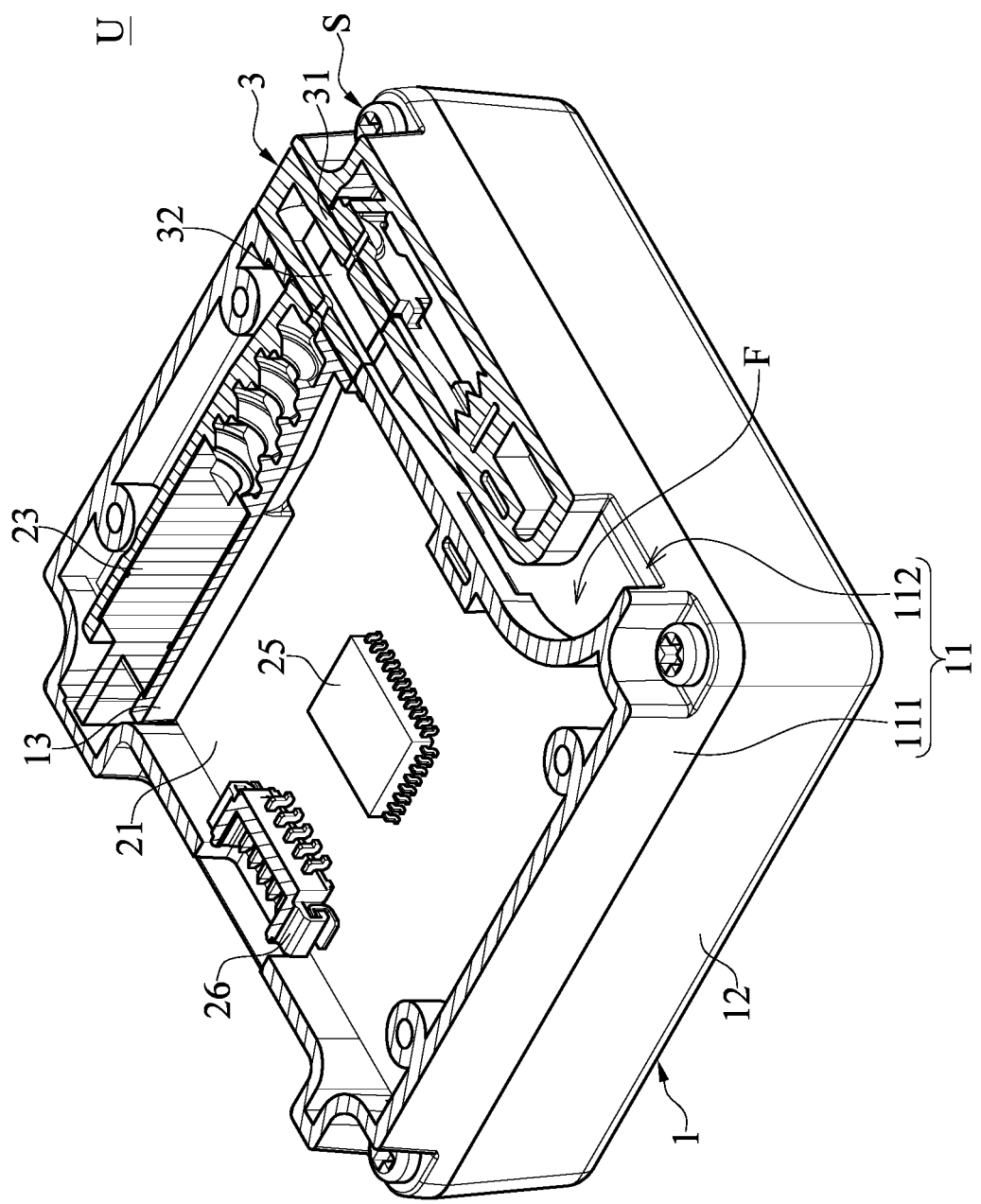
FIG. 6 is a cross-sectional perspective schematic view taken along line VI-VI of FIG. 1.

References are made to FIG. 3 to FIG. 6. FIG. 3 is a schematic view of the gas detecting device in use in the first embodiment of the present disclosure. FIG. 4 is a cross-sectional perspective schematic view taken along line VII-VII of FIG. 1. FIG. 5 is a cross-sectional perspective schematic view taken along line V-V of FIG. 3. FIG. 6 is a cross-sectional perspective schematic view taken along line VI-VI of FIG. 1. The gas detecting device U includes: a shell component 1, a sensing component 2, and a dust blocking element 3. The dust blocking element 3 can be detachably or replaceably disposed on the shell component 1, so as to prevent the dust and the particulate matter in the gas under test from polluting the sensing component 2. In other words, a conventional gas detecting device can be polluted by the dust and the particulate matter in the gas under test after being used for a period of time, which decreases the measurement accuracy of a sensing component of the conventional gas detecting device. In contrast, the present disclosure utilizes the dust blocking element 3 to cover at least one element (e.g., a sensor 22 of the sensing component 2) of the sensing component 2, so as to prevent the sensing component 2 from being polluted by the dust and the particulate matter in the gas under test, and the present disclosure can also, when a degree of pollution of the dust blocking element 3 exceeds a predetermined threshold, a new or clean dust blocking element 3 can be replaced onto the gas detecting device U, given that the dust blocking element 3 is detachably disposed on the shell component 1.

Figure 7:
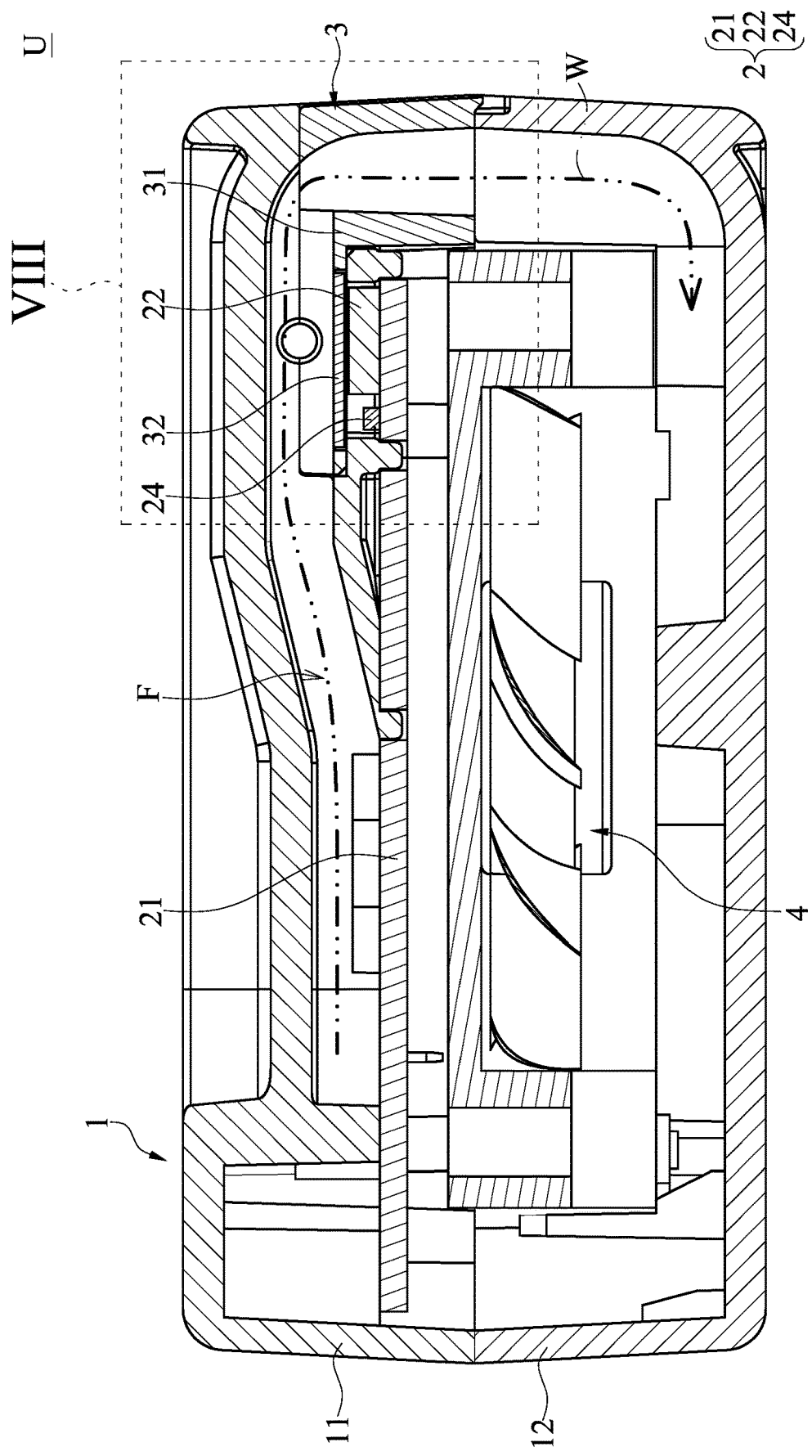
FIG. 7 is a cross-sectional schematic view taken along line VII-VII of FIG. 1.
Figure 8:
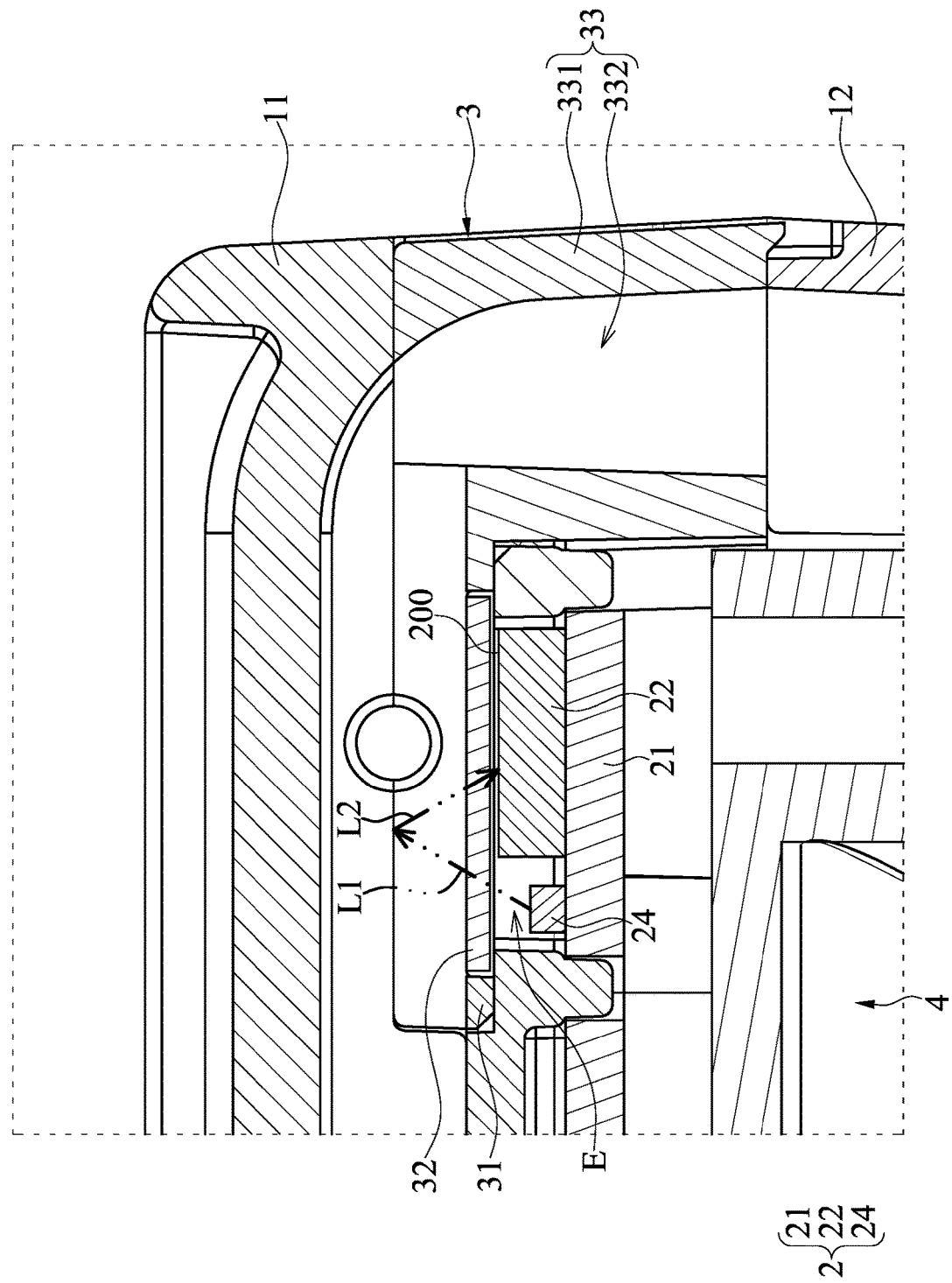
FIG. 8 shows an enlarged view of part VIII of FIG. 7.
Figure 9:
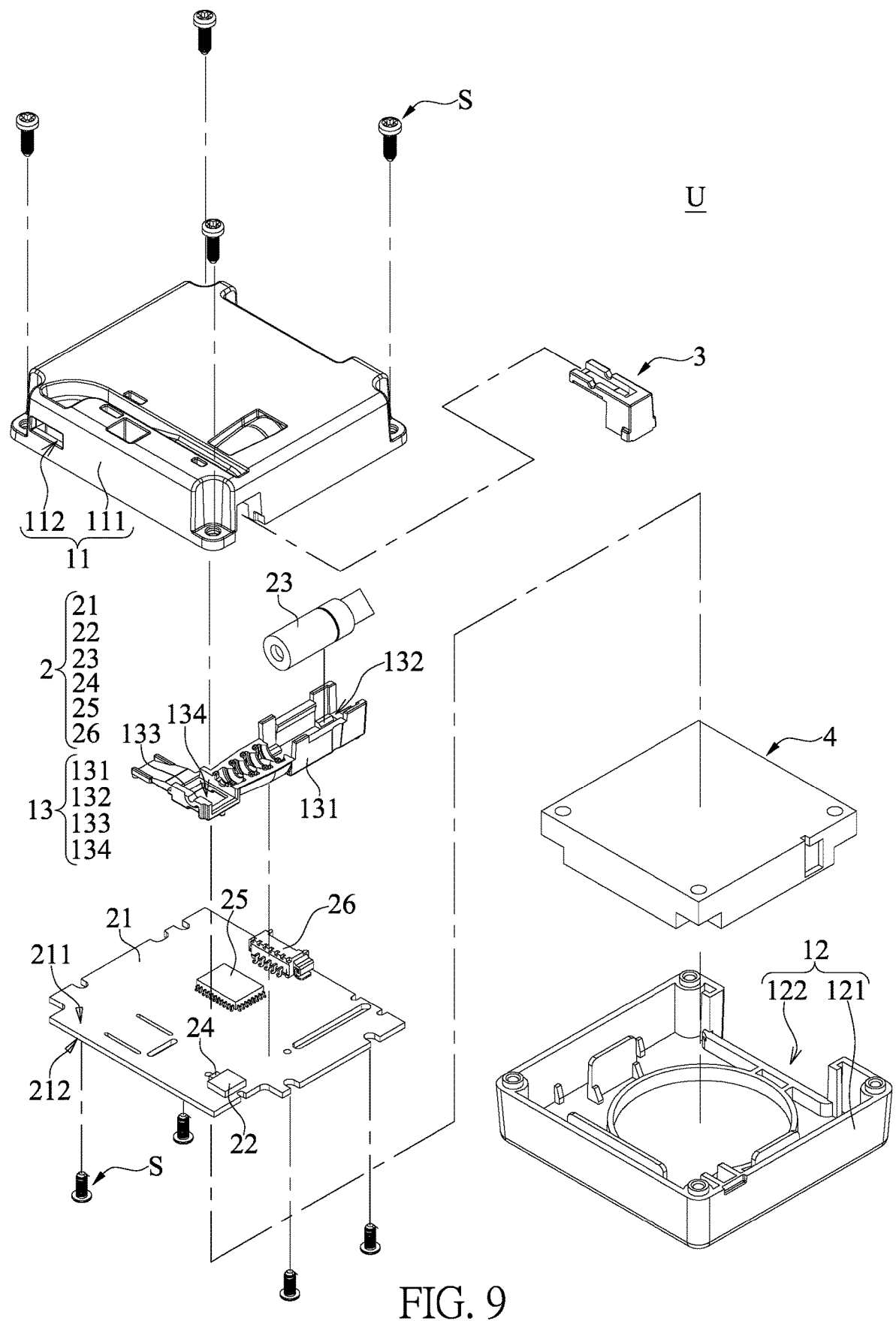
FIG. 9 is an exploded perspective schematic view of the gas detecting device in the first embodiment of the present disclosure.
Figure 10:
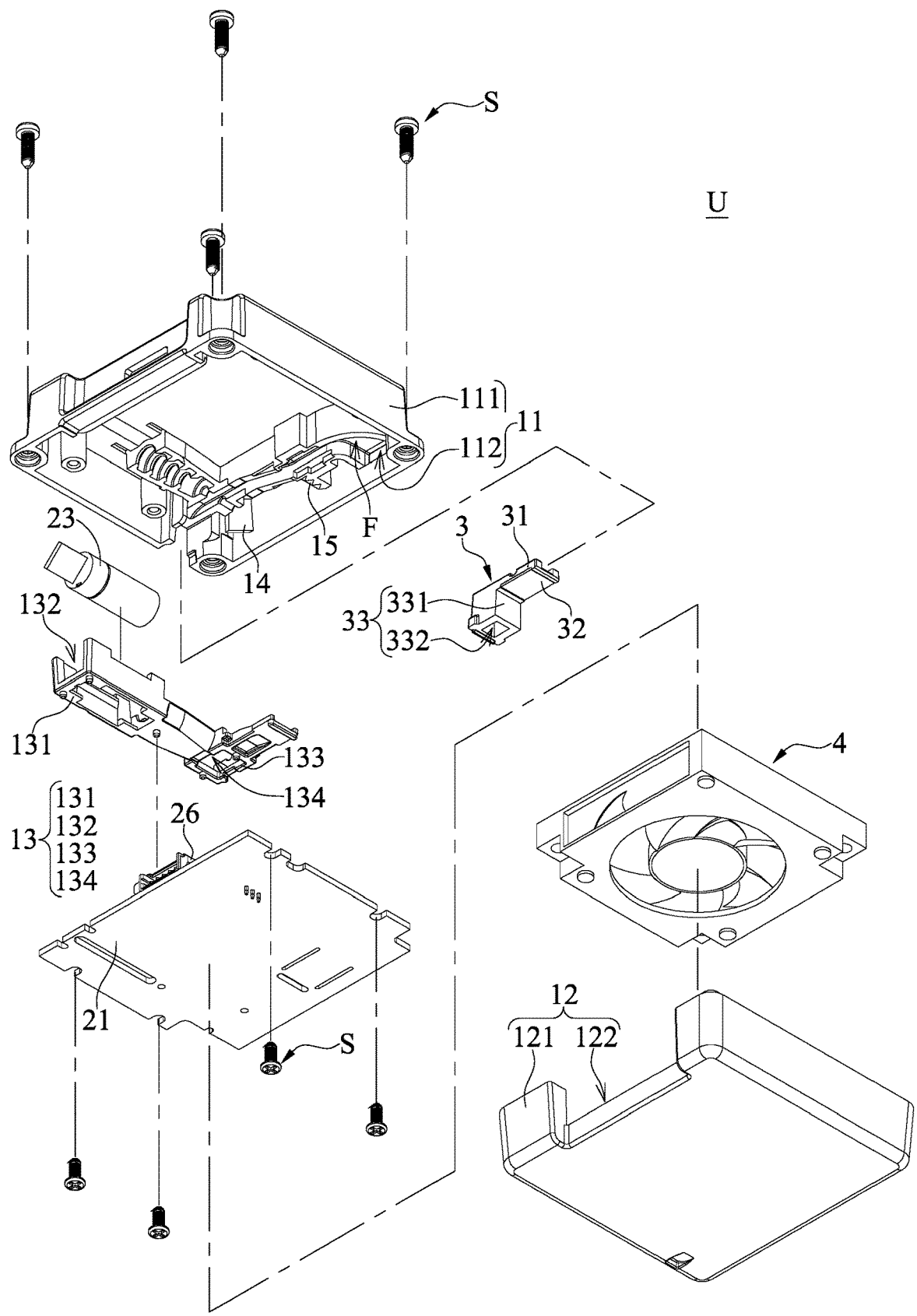
FIG. 10 is another exploded perspective schematic view of the gas detecting device in the first embodiment of the present disclosure.
Figure 11:
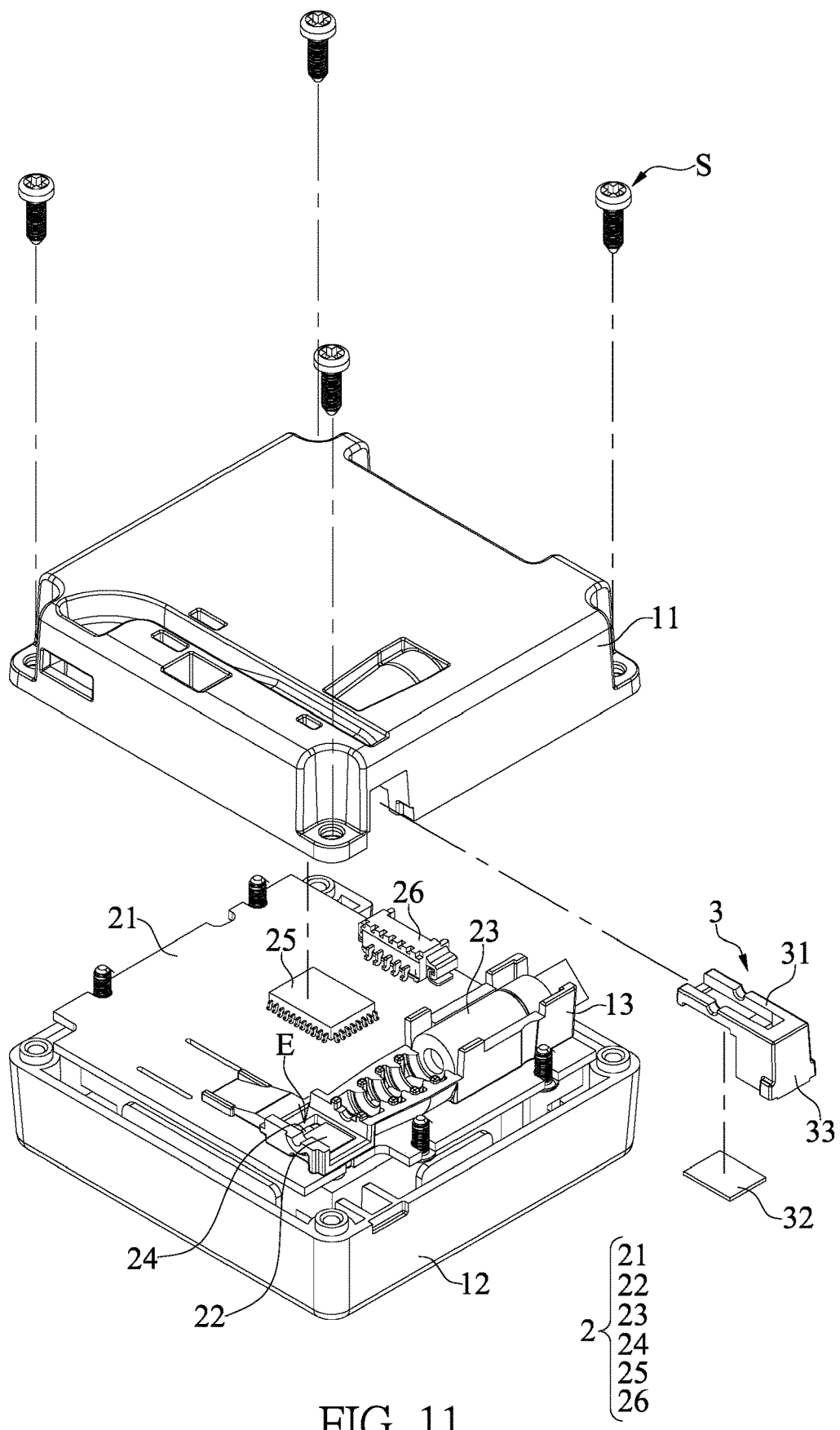
FIG. 11 is yet another exploded perspective schematic view of the gas detecting device in the first embodiment of the present disclosure.
Figure 12:
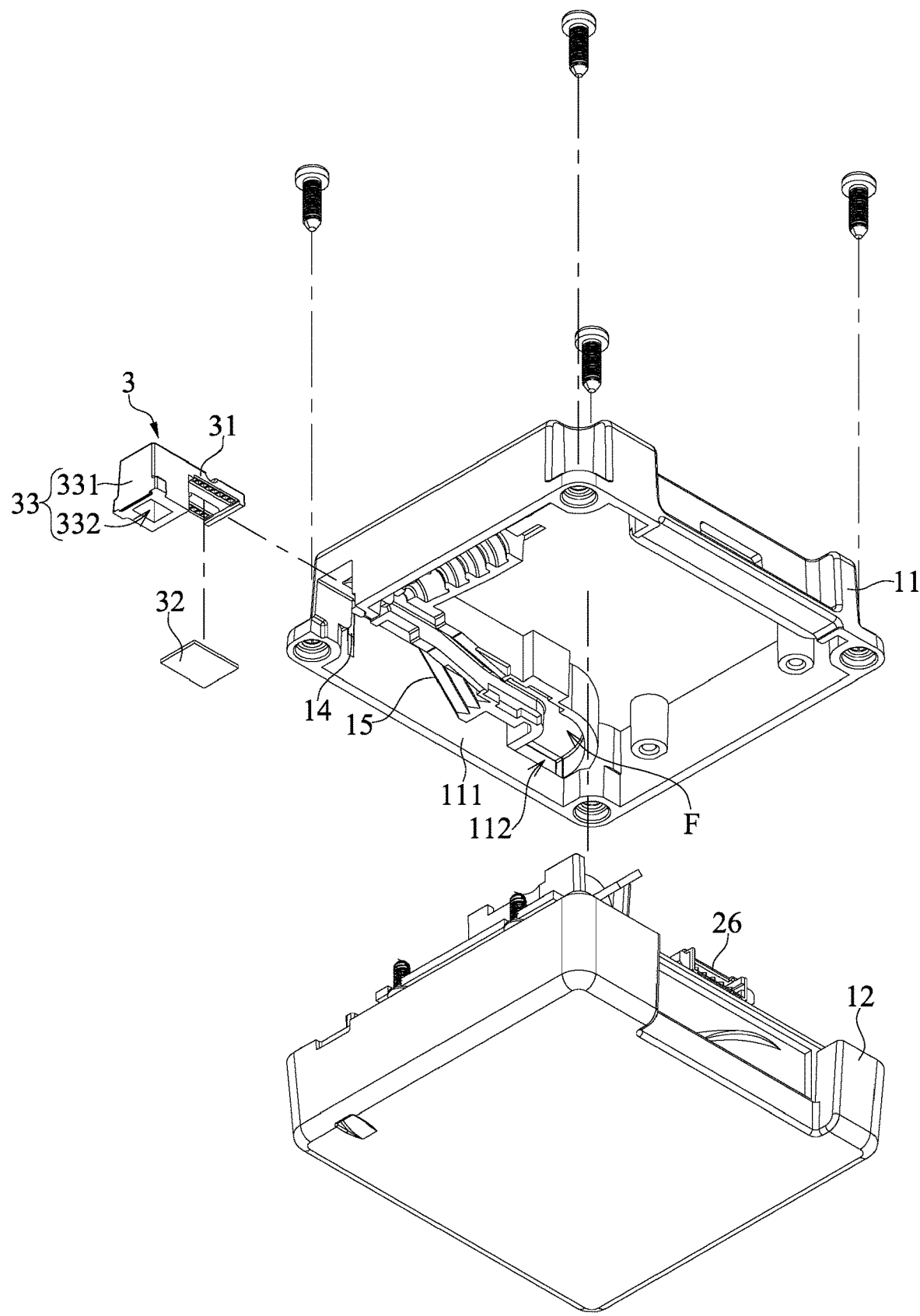
FIG. 12 is yet another exploded perspective schematic view of the gas detecting device in the first embodiment of the present disclosure.

Moreover, references are further made to FIG. 1 to FIG. 6, which are to be read in conjunction with FIG. 7 and FIG. 8. FIG. 7 is a cross-sectional schematic view taken along line VII-VII of FIG. 1. FIG. 8 shows an enlarged view of part VIII of FIG. 7. Specifically speaking, the shell component 1 includes a gas passage F and a groove 10. The gas under test can pass through a detecting area D on a path of the gas passage F along the gas passage F. Preferably, the gas detecting device U can further include a fan component 4, the fan component 4 is disposed in the shell component 1, and the fan component 4 is able to generate a gas flow W to drive the gas under test to flow into the gas passage F and to pass through the detecting area D. Moreover, the sensing component 2 is disposed inside the shell component 1, the sensing component 2 includes a substrate 21, a sensor 22 that is disposed on the substrate 21, and a laser light source 23 that is disposed on the substrate 21. The sensor 22 and the laser light source 23 are respectively disposed corresponding to the detecting area D. Moreover, the dust blocking element 3 is detachably disposed in the groove 10 of the shell component 1, such that the dust and the particulate matter in the gas under test are prevented from polluting the sensor 22 of the sensing component 2. The dust blocking element 3 includes a base 31 and a cover 32 that is disposed on the base 31. The cover 32 is light permeable, the cover 32 is disposed corresponding to the detecting area D, and a vertical projection of the cover 32 on the substrate 21 and a vertical projection of the sensor 22 on the substrate 21 at least partially overlap with each other. In other words, the sensor 22 and the cover 32 are two different elements, and the cover 32 can cover a top surface 200 of the sensor 22, so as to prevent the dust and the particulate matter in the gas under test from polluting the sensor 22 of the sensing component 2. Furthermore, for example, the top surface 200 of the sensor 22 can be disposed adjacent to the cover 32, and an interval that is greater than or equal to zero millimeters can be formed between the top surface 200 of the sensor 22 and the cover 32. In addition, it is worth mentioning that the cover 32 can be disposed on the base 31 through a method of spot gluing, heat pressing, and insert molding, but the present disclosure is not limit thereto.

For the present disclosure, the laser light source 23 can generate a laser beam (not labeled in the figures) that projects onto the detecting area D, such that the sensor 22 is able to detect the sizes and the concentration of particulate matter in the gas under test passing through the detecting area D. In addition, more preferably, the sensing component 2 can further include a processor 25, the processor 25 can be electrically connected to the sensor 22, so as to receive an electrical signal (e.g., a voltage signal, or a current signal, but the present disclosure is not limited thereto) that is generated by the sensor 22 after detecting the dust and the particulate matter in the gas under test, and the processor 25 can then utilize the received electrical signal and the Mie scattering principle to calculate the size and the concentration of the dust and the particulate matter in the gas under test. In addition, for example, the processor 25 can be a microcontroller unit (MCU), and the sensor 22 can be a light sensing element, such as a photodiode, but the present disclosure is not limited thereto.

Figure 13:
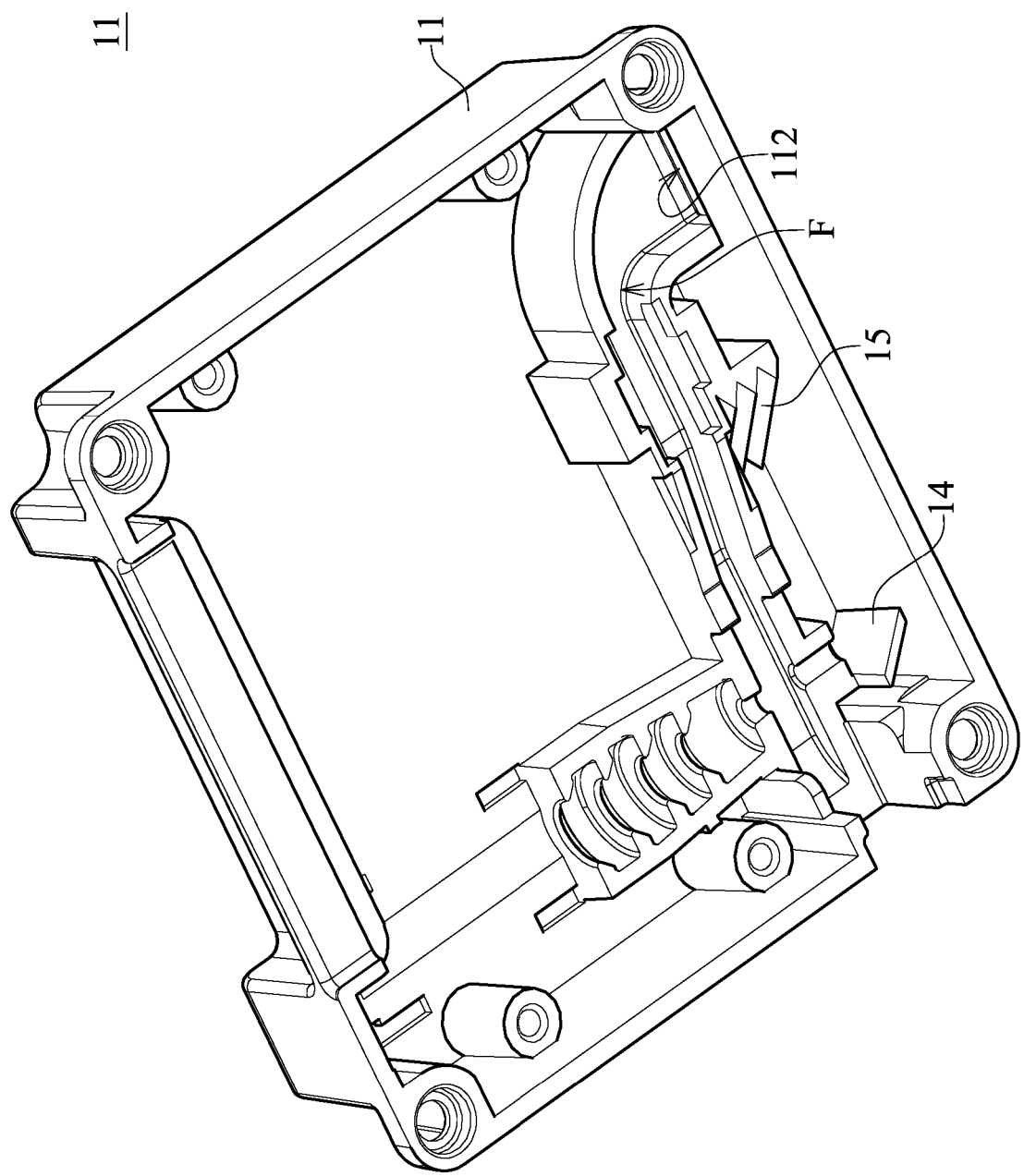
FIG. 13 is a perspective schematic view of a first shell of the gas detecting device in the first embodiment of the present disclosure.
Figure 14:
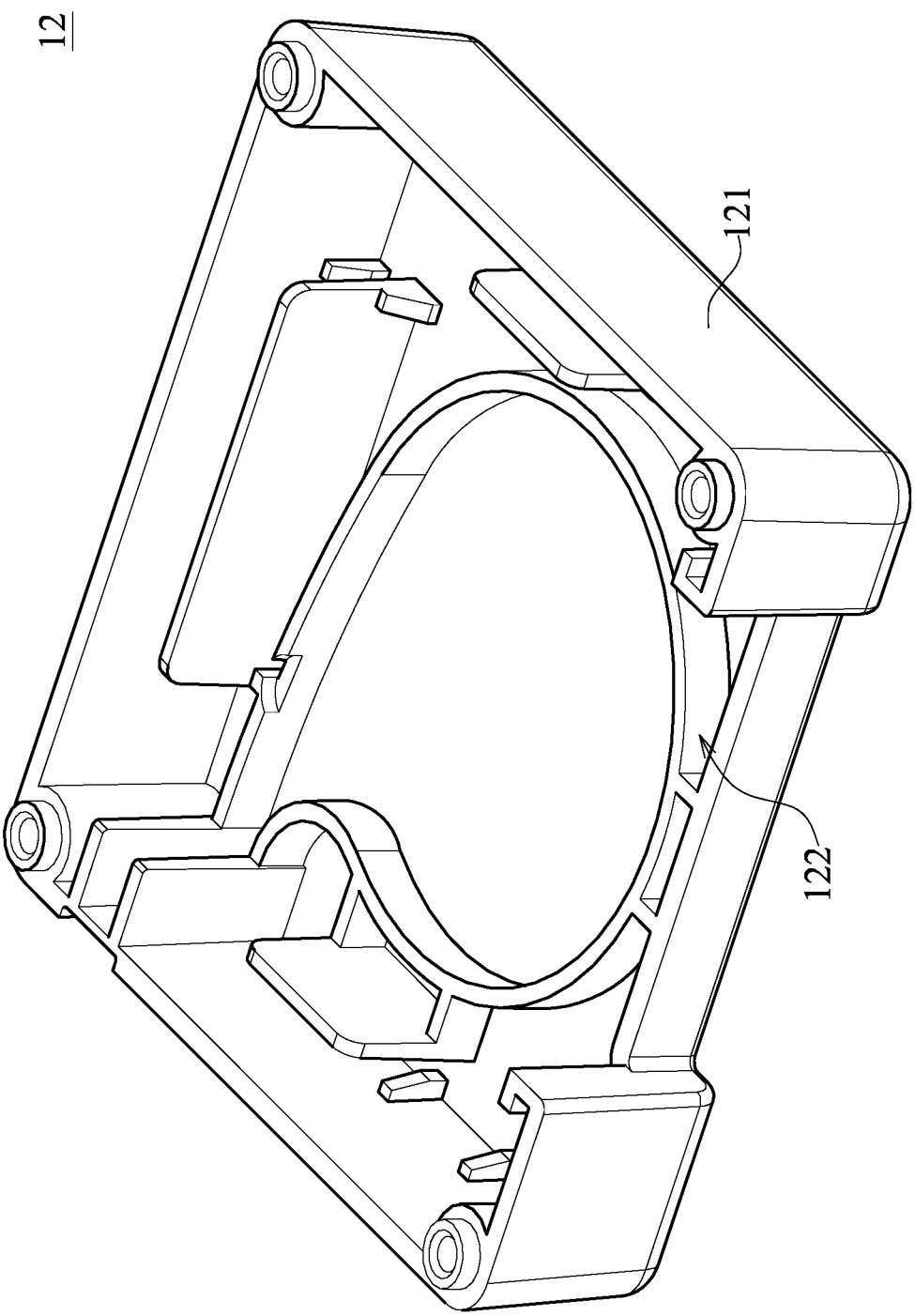
FIG. 14 is a perspective schematic view of a second shell of the gas detecting device in the first embodiment of the present disclosure.

Moreover, references are further made to FIG. 1 to FIG. 8, which are to be read in conjunction with FIG. 9 to FIG. 14. FIG. 9 to FIG. 12 are exploded perspective schematic views of the gas detecting device in the first embodiment of the present disclosure. FIG. 13 is a perspective schematic view of a first shell of the gas detecting device in the first embodiment of the present disclosure. FIG. 14 is a perspective schematic view of a second shell of the gas detecting device in the first embodiment of the present disclosure. For example, the shell component 1 can include a first shell 11 and a second shell 12 corresponding to the first shell 11, an accommodating space (not shown in the figures) is formed between the first shell 11 and the second shell 12, and the first shell 11, the second shell 12, the sensing component 2, and the fan component 4 can be assembled to one another through a securing element S. Moreover, the first shell 11 includes a first shell body 111 and a gas inlet 112 disposed on the first shell body 111, and the second shell 12 includes a second shell body 121 and a gas outlet 122 disposed on the second shell body 121. The gas passage F is formed between the gas inlet 112 and the gas outlet 122, and the fan component 4 can generate the gas flow W which drives the gas under test to pass through the detecting area D from the gas inlet 112, and then drives the gas under test to be discharged from the gas outlet 122. However, it should be noted that the present disclosure is described by exemplifying the gas inlet 112 as being disposed on the first shell body 111 and the gas outlet 122 as being disposed on the second shell body 121, but the present disclosure does not limit the positions of the gas inlet 112 and the gas outlet 122.

The substrate 21 can include a first surface 211 and a second surface 212 corresponding to the first surface 211, the first shell 11 is disposed more adjacent to the first surface 211 compared to the second shell 12, and the second shell 12 is disposed more adjacent to the second surface 212 compared to the first shell 11. In addition, the fan component 4 can be disposed between the second surface 212 of the substrate 21 and the second shell 12. In addition, the shell component 1 can further include a mounting seat 13, the mounting seat 13 can be disposed between the first surface 211 of the substrate 21 and the first shell 11, and the laser light source 23 can be disposed on the mounting seat 13. The mounting seat 13 can include a seat body 131, an accommodating groove 132 disposed on the seat body 131, a frame 133 connected to the seat body 131 and a through hole 134 penetrating through the frame 133. The laser light source 23 can be disposed in the accommodating groove 132. The frame 133 can be disposed adjacent to the sensor 22, and the frame 133 can surround the sensor 22 such that the sensor 22 is positioned in the through hole 134. The sensor 22 can be exposed relative to the frame 133, and a vertical projection of the through hole 134 on the substrate 21 and the vertical projection of the sensor 22 on the substrate 21 at least partially overlap with each other. Moreover, the base 31 of the dust blocking element 3 is able to abut against the seat body 131 of the mounting seat 13, and the cover 32 of the dust blocking element 3 is able to cover the through hole 134 of the mounting seat 13, such that the vertical projection of the cover 32 on the substrate 21 and the vertical projection of the through hole 134 on the substrate 21 at least partially overlap with each other. Therefore, the sensor 22 can be disposed on a covered area E that is formed among the substrate 21, the frame 133 and the cover 32, so as to prevent the sensor 22 from being polluted by the dust and the particulate matter in the gas under test passing through the gas passage F.

The shell component 1 can further include a light guiding board 14 disposed on the first shell body 111 and a light extinction structure 15 that is disposed on the first shell body 111 and is disposed adjacent to the light guiding board 14. For example, after the laser beam generated by the laser light source 23 passes through the detecting area D, the laser beam can be projected onto the light guiding board 14, and the laser beam that is projected onto the light guiding board 14 can then be projected to the light extinction structure 15 through being reflected by the light guiding board 14, thus preventing the laser beam from being reflected to the detecting area D which affects the accuracy of the detection.

The dust blocking element 3 can further include a diversion structure 33, the diversion structure 33 is connected to the base 31, the diversion structure 33 includes a diversion body 331 and a diverting hole 332 that is disposed on the diversion body 331, and the diverting hole 332 is connected to the gas passage F. In other words, for the present disclosure, the diversion structure 33 can be connected to the base 31 and arranged to be turned relative to the base 31, and the base 31 and the diversion body 331 cooperatively enclose the groove 10. Therefore, the gas passage F is formed between the shell component 1 and the dust blocking element 3, and the dust blocking element 3 is able to block the sensor 22 outside the gas passage F, so as to prevent the particulate matter in the gas under test from polluting the sensor 22. In addition, for example, the shell component 1 can further include a first affixing part 1F that is disposed adjacent to the groove 10, the dust blocking element 3 can further include a second affixing part 3F corresponding to the first affixing part 1F, and the dust blocking element 3 is affixed to the first affixing part 1F of the shell component 1 through the second affixing part 3F. However, it should be noted that, in other implementations, the groove 10 and the dust blocking element 3 can also be disposed to be tightly engaged with each other, such that the dust blocking element 3 can be affixed in the groove 10.

It is worth mentioning that, since the diversion structure 33 is arranged to be turned relative to the base 31, the gas passage F is also arranged to be turned at the position where the diversion structure 33 turns, which leads to the dust and the particulate matter in the gas under test to accumulate or attach to a wall of the gas passage F at the position correspondingly, causing a clog in the gas passage F. Therefore, when replacing the dust blocking element 3 with a new or a clean one onto the gas detecting device U, the dust and the particulate matter that accumulate or attach to the wall of the gas passage F can be removed simultaneously.

Furthermore, references are further made to FIG. 4 to FIG. 12. The sensing component 2 can further include a reference light source 24 that is disposed on the first surface 211 of the substrate 21 and is disposed adjacent to the sensor 22, and a vertical projection of the reference light source 24 on the substrate 21 and the vertical projection of the cover 32 on the substrate 21 at least partially overlap with each other. For example, the reference light source 24 can be a light emitting diode (LED), but the present disclosure is not limited thereto. In addition, the reference light source 24 can project a reference beam L1 projecting toward the cover 32 and the detecting area D, and the reference beam L1 can generate a feedback beam L2 projecting toward the cover 32 and the sensor 22 through being reflected by a part of the shell component 1 positioned at the detecting area D. Therefore, the sensor 22 and the processor 25 are able to obtain the degree of pollution of the cover 32 of the dust blocking element 3 according to the energy of the feedback beam L2.

The sensing component 2 can further include a signal transmitting element 26 that is disposed on the substrate 21, and the processor 25 is electrically connected to the sensor 22, the reference light source 24, and the signal transmitting element 26. Therefore, the signal transmitting element 26 can be utilized to transmit a pollution degree information of the cover 32 to an electronic device (not shown in the figures). For example, the signal transmitting element 26 of the gas detecting device U and the electronic device can be wirelessly or wiredly connected to each other, and the present disclosure is not limited thereto. For example, for the present disclosure, the signal transmitting element 26 can be a connector, which wiredly transmits the signal (e.g., the pollution degree information) to the electronic device, and the signal transmitting element 26 can also be utilized to supply power to the gas detecting device U, and the present disclosure is not limited thereto. It is worth mentioning that, in other implementations, the signal transmitting element 26 can be a Bluetooth® module, a Wi-Fi module, and a Near-Field-Communication (NFC) module, which wirelessly transmits the signal to the electronic device, and the present disclosure does not limit the transmission method of the signal transmitting element 26.

Figure 15:
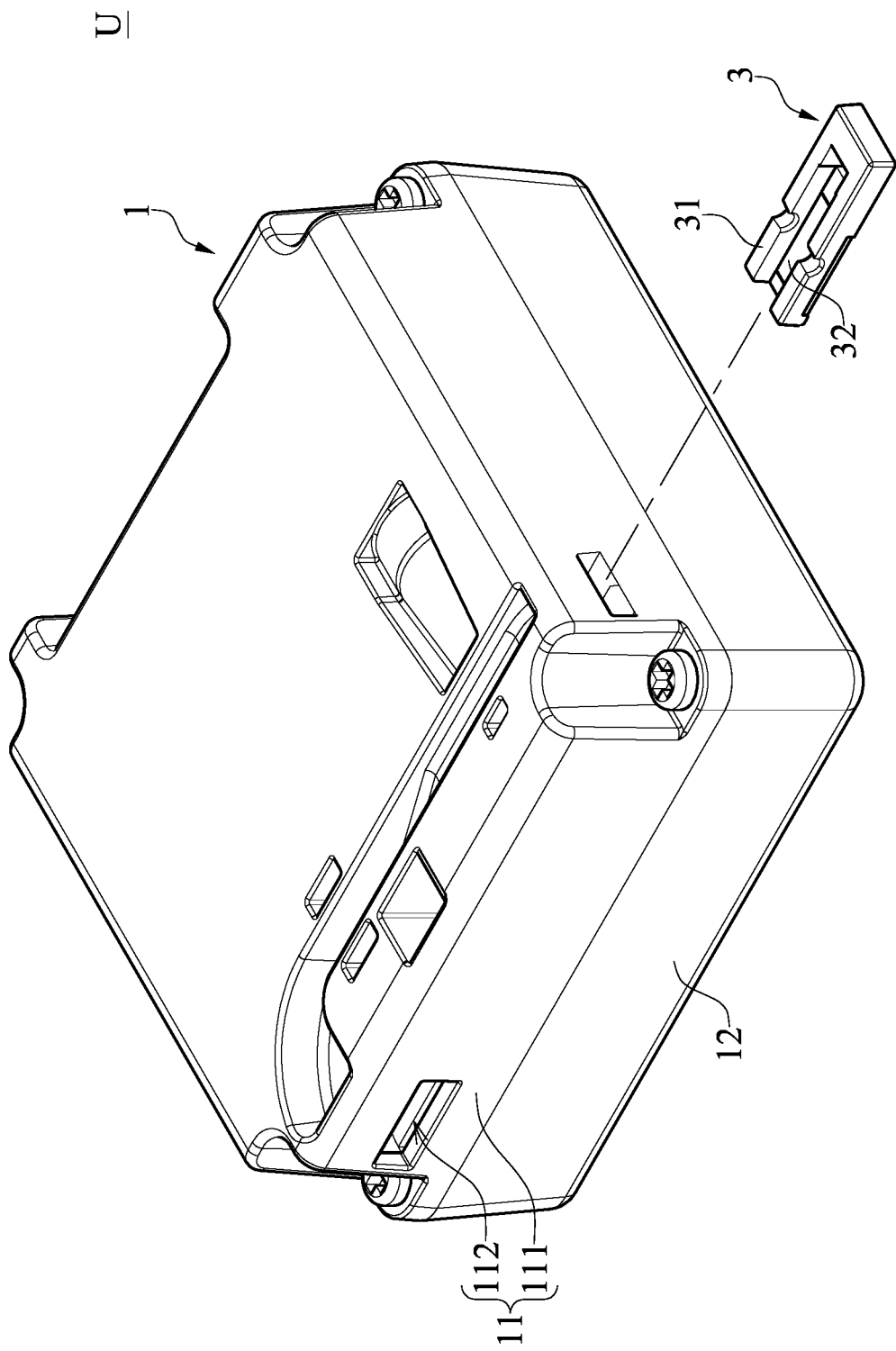
FIG. 15 is another schematic view of the gas detecting device in use in the first embodiment of the present disclosure.

In addition, reference is made to FIG. 15, which is another schematic view of the gas detecting device in use in the first embodiment of the present disclosure. It can be realized through the comparison of FIG. 3 and FIG. 15 that the shape and the structure of the dust blocking element 3 and the groove 10 in FIG. 3 and the shape and the structure of the dust blocking element 3 and the groove 10 in FIG. 15 are different from each other. In other words, in the implementation shown in FIG. 15, the cover 32 can be disposed on a thin-film-shaped base 31, and the shell component 1 has a groove 10 corresponding to the cover 32 and the thin-film-shaped base 31.

Second Embodiment

Figure 16:
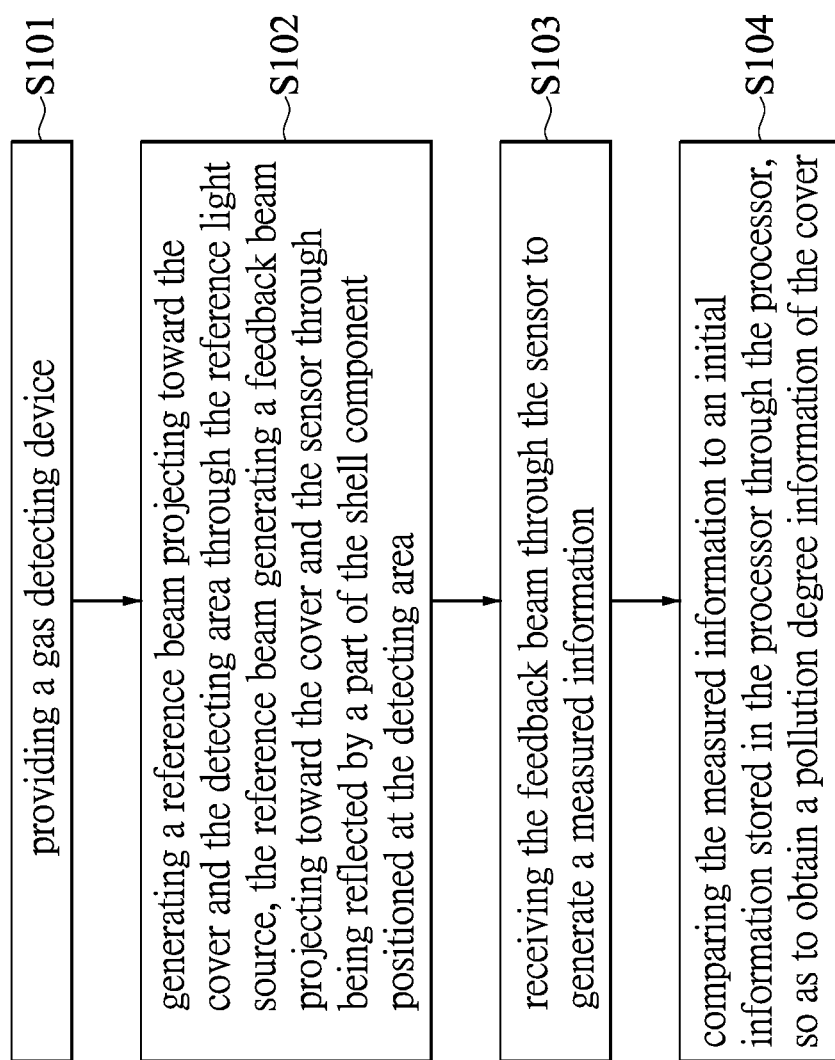
FIG. 16 is a flowchart of a maintenance method of the gas detecting device in a second embodiment of the present disclosure.

Firstly, reference is made to FIG. 16, which is a flowchart of a maintenance method of the gas detecting device in a second embodiment of the present disclosure. The second embodiment of the present disclosure provides a maintenance method of a gas detecting device U including the following steps: step S101: providing the gas detecting device U. For example, the gas detecting device U can include a shell component 1, a sensing component 2, a dust blocking element 3, and a detecting area D. The sensing component 2 and the dust blocking element 3 are disposed inside the shell component 1, and the sensing component 2 and the dust blocking element 3 are disposed corresponding to the detecting area D. In addition, the sensing component 2 includes a sensor 22, a reference light source 24, and a processor 25. The processor 25 is electrically connected to the sensor 22. The dust blocking element 3 is detachably disposed on the shell component 1, the dust blocking element 3 includes a cover 32, and the cover 32 is light permeable. Moreover, the sensing component 2 can further include a substrate 21, and the sensor 22, the reference light source 24, and the processor 25 are disposed on the substrate 21. Furthermore, a vertical projection of the cover 32 on the substrate 21 and a vertical projection of the reference light source 24 on the substrate 21 at least partially overlap with each other. It is worth mentioning that, the structure of the gas detecting device U described in the second embodiment are similar to that of the gas detecting device U described in the first embodiment, and will not be reiterated herein.

Next, in step S102, a reference beam L1 projecting toward the cover 32 and the detecting area D is generated through the reference light source 24, and the reference beam L1 is able to generate a feedback beam L2 projecting toward the cover 32 and the sensor 22 through being reflected by a part of the shell component 1 positioned at the detecting area D. For example, referring to FIG. 8, the reference beam L1 is projected onto the part of the shell component 1 positioned at the detecting area D through the cover 32, the reference beam L1 projected onto the part of the shell component 1 positioned at the detecting area D can form the feedback beam L2 through being reflected by the shell component 1, and the feedback beam L2 can be projected to the sensor 22 through the cover 32, such that the sensor 22 can receive the energy of the feedback beam L2.

Next, in step S103, the feedback beam L2 is received through the sensor 22 to generate a measured information. For example, referring to FIG. 8, after the sensor 22 receives the energy from the feedback beam L2, the sensor 22 can generate an electrical signal (e.g., a voltage signal or a current signal, but the present disclosure is not limited thereto), and the processor 25 can obtain the measured information through calculating the electrical signal generated by the sensor 22.

Next, in step S104, the measured information is compared to an initial information stored in the processor 25 through the processor 25, so as to obtain a pollution degree information of the cover 32. For example, the initial information can be the electrical signal obtained by the gas detecting device U when utilizing the sensor 22 of the gas detecting device U to detect the energy of the feedback beam L2 generated by the reference light source 24 under a current condition, before the gas detecting device U is released by the manufacturers. The processor 25 can obtain the initial information through calculating the electrical signal generated by the sensor 22. That is to say, under a condition that the cover 32 of the gas detecting device U is clean and unpolluted by the dust and the laser light source 23 and the fan component 4 are turned off, the reference light source 24 generates a reference beam L1 projecting toward the cover 32 and the detecting area D, the reference beam L1 generates a feedback beam L2 projecting toward the cover 32 and the sensor 22 through being reflected or refracted by the part of the shell component 1 positioned at the detecting area D, the sensor 22 can generate an electrical signal according to the received feedback beam L2, the processor 25 can obtain an initial information through calculating the electrical signal generated by the sensor 22, and the obtained initial information indicates that the cover 32 is under a condition of being clean and unpolluted by the dust. Therefore, the pollution degree information of the cover 32 can be obtained through comparing the measured information and the initial information. For example, the measured information is a measured current value of the energy of the feedback beam L2 measured by the sensor 22 and the initial information is an initial current value that is stored in the processor 25. That is to say, the pollution degree information of the cover 32 of the gas detecting device U after being used for a period of time can be obtained through comparing the measured current value and the initial current value.

It is worth mentioning that, in the step of obtaining the pollution degree information of the cover 32 through the processor 25 comparing the measured information and the initial information, storing the pollution degree information of the cover 32 in the processor 25 can be further included. In addition, the abovementioned maintenance method of the gas detecting device U can be regularly conducted after the gas detecting device U is used for a period of time through utilizing the processor 25 to control the gas detecting device U, so as to monitor the pollution degree information of the cover 32 of the gas detecting device U.

Figure 17:
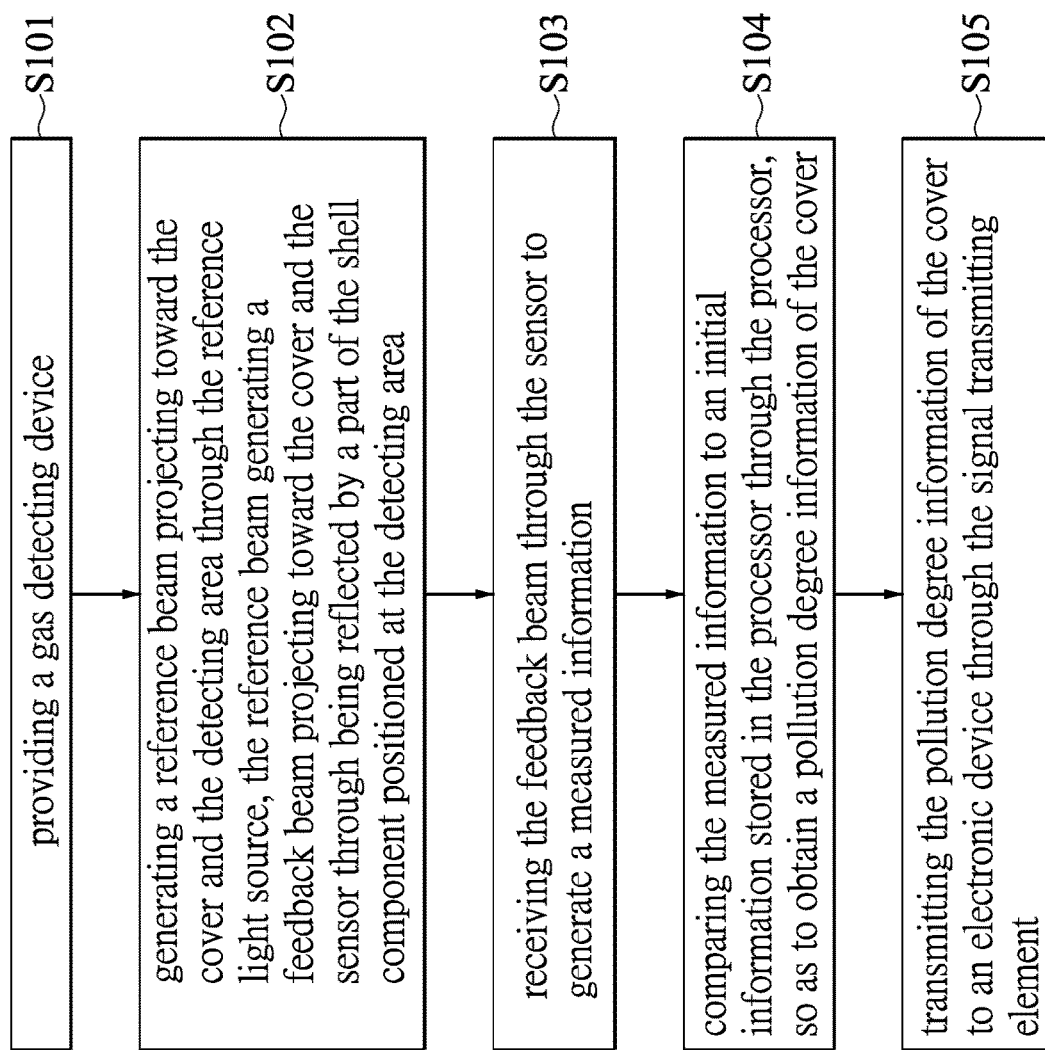
FIG. 17 is another flowchart of the maintenance method of the gas detecting device in the second embodiment of the present disclosure.

Moreover, reference is made to FIG. 17, which is another flowchart of the maintenance method of the gas detecting device in the second embodiment of the present disclosure. It can be realized through a comparison between FIG. 16 and FIG. 17, in the implementation shown in FIG. 17, the sensing component 2 can further include a signal transmitting element 26, the signal transmitting element 26 is disposed on the substrate 21, the processor 25 is electrically connected to the signal transmitting element 26, and the signal transmitting element 26 is able to transmit the pollution degree information of the cover 32 to an electronic device (not shown in the figures). In addition, it is worth mentioning that, in the implementation as shown in FIG. 17, step S101, step S102, step S103, and step S104 are the same as that of the abovementioned implementation shown in FIG. 16, and will not be reiterated herein.

The maintenance method of the gas detecting device U provided by the second embodiment of the present disclosure further includes: step S105: transmitting the pollution degree information of the cover 32 to an electronic device through the signal transmitting element 26. In other words, after the step of comparing the measured information and the initial information to obtain the pollution degree information of the cover 32, the signal transmitting element 26 can be further utilized to transmit the pollution degree information of the cover 32 to an electronic device, so as to inform a user to determine whether or not to a new or clean dust blocking element 3 is replaced. Furthermore, after the step of comparing the measured information and the initial information to obtain the pollution degree information of the cover 32, the following step is further included: determining whether or not the pollution degree information of the cover 32 exceeds a predetermined threshold, and when the pollution degree information of the cover 32 does exceed the predetermined threshold, the pollution degree information of the cover 32 is transmitted to an electronic device through the signal transmitting element 26. Therefore, in one of the implementations, the processor 25 determines whether or not the pollution degree information of the cover 32 exceeds the predetermined threshold through determining whether or not a difference between the initial current value and the measured current value exceeds the predetermined threshold. In addition, it should be noted that the present disclosure does not limit the timing of transmitting the pollution degree information of the cover 32 to an electronic device. That is to say, the gas detecting device U can transmit the pollution degree information of the cover 32 to an electronic device through the signal transmitting element 26 in a predetermined period of time, e.g., one month or two months. In addition, the gas detecting device U can also transmit the pollution degree information of the cover 32 to an electronic device through the signal transmitting element 26 when the pollution degree information of the cover 32 exceeds the predetermined threshold.

One of the advantages of the present disclosure is that the gas detecting device U provided by the present disclosure is able to enhance the service life of the gas detecting device U through "having the dust blocking element 3 detachably disposed in the groove 10 of the shell component 1, the dust blocking element 3 including a base 31 and a cover 32 disposed on the base 31", and "the cover 32 being light permeable, the cover 32 disposed corresponding to the detecting area D, and the vertical projection of the cover 32 on the substrate 21 and a vertical projection of the sensor 22 on the substrate 21 at least partially overlapping with each other".

Moreover, the maintenance method of the present disclosure is able to obtain the pollution degree information of the cover 32 of the gas detecting device U, so as to inform the user of replacing the dust blocking element 3 with a new or clean one through "generating a reference beam L1 projecting toward the cover 32 and the detecting area D through the reference light source 24, the reference beam L1 being able to generate a feedback beam L2 projecting toward the cover 32 and the sensor 22 through being reflected by a part of the shell component 1 positioned at the detecting area D", "receiving the feedback beam L2 through the sensor 22 to generate a measured information", and "comparing the measured information to an initial information in the processor 25 through the processor 25, so as to obtain a pollution degree information of the cover 32", which enhance the accuracy and the stability of measurement of the gas detecting device U.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A maintenance method of a gas detecting device, comprising:
   providing the gas detecting device, the gas detecting device including a shell component, a sensing component, a dust blocking element, and a detecting area, the sensing component and the dust blocking element being disposed in the shell component, and the sensing component and the dust blocking element being disposed corresponding to the detecting area, wherein the sensing component includes a sensor, a reference light source, and a processor, the processor is electrically connected to the sensor, the dust blocking element includes a cover, and the cover is light permeable;
   generating a reference beam projecting toward the cover and the detecting area through the reference light source, the reference beam generating a feedback beam projecting toward the cover and the sensor through being reflected by a part of the shell component positioned at the detecting area;
   receiving the feedback beam through the sensor to generate a measured information; and comparing the measured information to an initial information stored in the processor through the processor, so as to obtain a pollution degree information of the cover.

2. The maintenance method according to claim 1, wherein the sensing component further includes a signal transmitting element, and the processor is electrically connected to the signal transmitting element.

3. The maintenance method according to claim 2, wherein after comparing the measured information to the initial information in the processor through the processor, so as to obtain the pollution degree information of the cover, the method further comprises: transmitting the pollution degree information of the cover to an electronic device through the signal transmitting element.

4. The maintenance method according to claim 2, wherein after comparing the measured information to the initial information in the processor through the processor, so as to obtain the pollution degree information of the cover, the method further comprises: determining whether or not the pollution degree information of the cover exceeds a predetermined threshold, and when the pollution degree information of the cover does exceed the predetermined threshold, transmitting the pollution degree information of the cover to an electronic device through the signal transmitting element.

5. The maintenance method according to claim 4, wherein the measured information is a measured current value of the energy of the feedback beam measured by the sensor and the initial information is an initial current value that is stored in the processor.

6. The maintenance method according to claim 5, wherein when determining whether or not the pollution degree information of the cover exceeds the predetermined threshold, the processor is utilized to determine whether a difference between an initial current value and the measured current value exceeds the predetermined threshold.

7. The maintenance method according to claim 2, wherein the sensing component further includes a substrate, and the sensor, the reference light source, the processor, and the signal transmitting element are disposed on the substrate; and wherein a vertical projection of the cover on the substrate and a vertical projection of the sensor on the substrate at least partially overlap with each other, and the vertical projection of the cover on the substrate and a vertical projection of the reference light source on the substrate at least partially overlap with each other.

8. The maintenance method according to claim 2, wherein the step of comparing the measured information to the initial information in the processor through the processor, so as to obtain the pollution degree information of the cover further includes: storing the pollution degree information of the cover in the processor.

9. The maintenance method according to claim 1, wherein the reference beam passes through the cover and is projected onto the part of the shell component positioned at the detecting area, and the feedback beam passes through the cover and is projected onto the sensor.

10. The maintenance method according to claim 1, wherein the measured information is a measured current value of the energy of the feedback beam measured by the sensor and the initial information is an initial current value that is stored in the processor.

* * * * *